Figure 1:
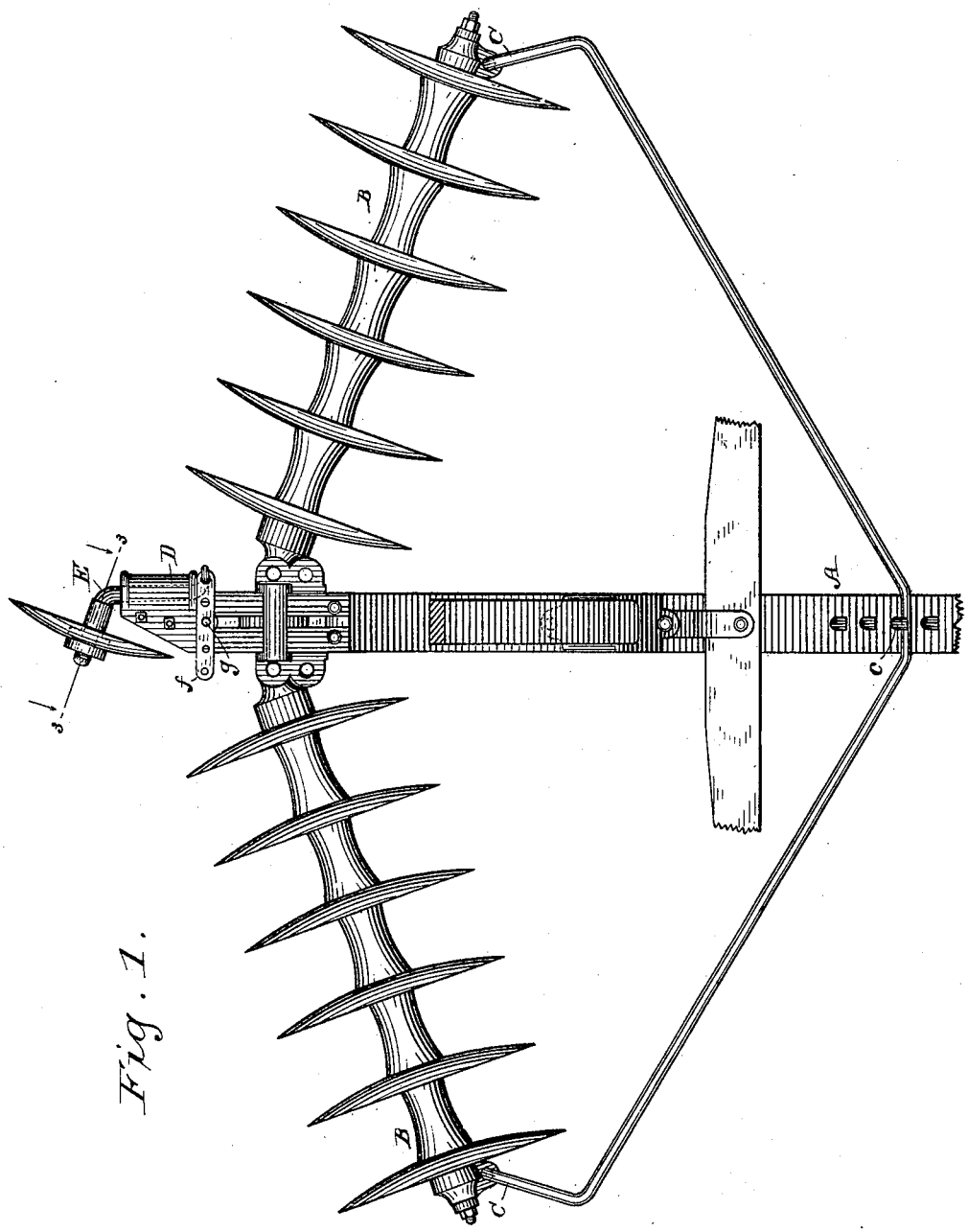

(No Model.) 2 Sheets—Sheet 1.

A. G. HILL.
WHEEL OR DISK HARROW.

No. 360,093. Patented Mar. 29, 1887.

WITNESSES
Ed. A. Newman
Al. C. Newman

INVENTOR
Andrew G. Hill
By his Attorneys
Baldwin, Hopkins & Peyton (No Model.) 2 Sheets—Sheet 2.
A. G. HILL.
WHEEL OR DISK HARROW.
No. 360,093. Patented Mar. 29, 1887.
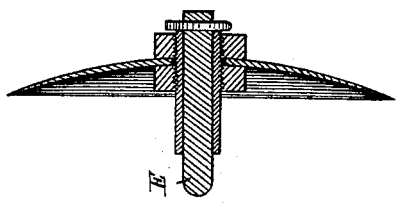
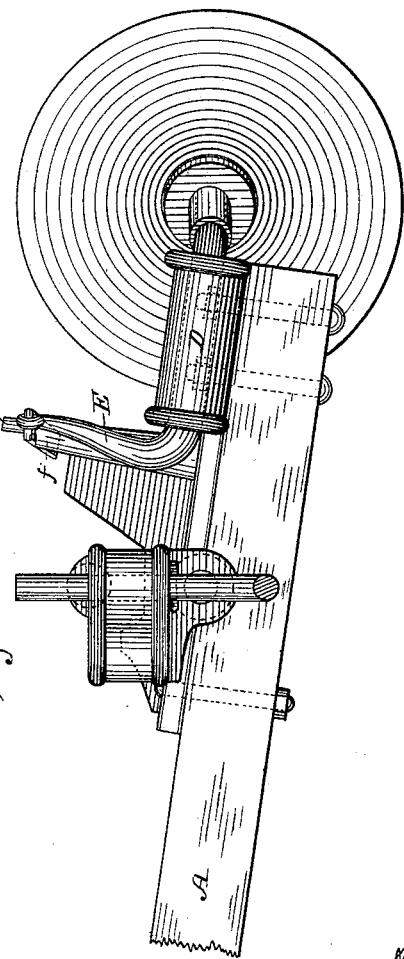
WITNESSES
Ed. A. Newman.
Al. C. Newman.
INVENTOR
Andrew G. Hill
By his Attorneys
Baldwin, Hopkins & Peyton.

United States Patent Office.

ANDREW G. HILL, OF PRESCOTT, ONTARIO, CANADA.

WHEEL OR DISK HARROW.

SPECIFICATION forming part of Letters Patent No. 360,093, dated March 29, 1887.

Application filed May 12, 1886. Serial No. 201,951. (No model.)

*To all whom it may concern:*

Be it known that I, ANDREW G. HILL, a citizen of the United States, residing at Prescott, in the Province of Ontario, Dominion of Canada, have invented a new and useful Improvement in Wheel or Disk Harrows, of which the following is a specification.

In this class of harrows the cutting-disks are arranged in gangs on opposite sides of a central draft-line. When the gangs of disks, which may be either straight or concavo-convex, are arranged to throw the earth from the center of the machine, the forward edges of the inner disks are nearest each other; but, notwithstanding this fact, there is of necessity left between the paths of the opposing gangs a ridge of earth which is imperfectly harrowed or cultivated. Where the gangs are arranged to throw the earth toward the center of the machine, the rear edges of the inner disks are nearest each other, and the size of the unharrowed strip of earth is increased, because the inner disks of the opposing gangs must be placed sufficiently far apart to permit the passage of lumps of earth, stones, and débris of all kinds, as otherwise the machine would become clogged.

In some of the original disk-harrows—such, for instance, as that shown in patent of F. Nishwitz, No. 97,680—rigid V-shaped frames were used and cutting-disks were arranged in opposing gangs on the inclined side bars of the frame. What was termed a "leading-disk" was also used, and its line of cut was about midway between the adjacent disks of the gangs. In such machines the gangs were not adjustable as gangs, nor was the central or leading disk, which formed part of one of the gangs, adjustable; nor was any means provided by which the driver could readily adjust the gangs from his seat on the machine; nor were the gangs capable of vibrating vertically to accommodate themselves to the ground over which they traversed.

In the modern machines having a tongue or frame, to which horizontally and vertically vibrating gangs of opposing disks have been hinged or connected, there has been, owing to the organization of such machines, more or less difficulty in cultivating the strip of earth between the inner ends of the two opposing gangs. It has been proposed to remedy the objection by using an ordinary colter or cultivator tooth, and such tooth has been made adjustable. It is, however, desirable that the entire surface of the ground traversed by a machine should be cultivated in a uniform manner to present a uniform appearance. Such colter or spring-teeth do not, therefore, meet all the requirements of the case, and are objectionable for other reasons.

My invention contemplates the employment, in connection with such adjustable vibratory opposing gangs, of a cutting-disk for cutting open the strip of earth that would otherwise be left between the adjacent inner disks of said gangs.

Speaking more specifically, the invention contemplates, in connection with opposing vibratory adjustable disk-gangs, the employment of a central cutting-disk, capable of working at an angle to the draft-line; further, such cutting-disk is preferably mounted on the frame or pole, instead of on one of the gangs, and is provided with adjusting mechanism for raising or lowering it and for varying its inclination relatively to the ground.

What I claim as my invention is, however, specifically set forth at the end of this specification.

In the accompanying drawings, Figure 1 is a plan view of a harrow, showing my improvement applied thereto; Fig. 2, an end view of the draft-pole, showing the supplemental cutting-disk, but omitting the gangs; and Fig. 3 is a detail view showing the manner of mounting the supplemental disk on its supporting-rod.

The particular form of harrow illustrated forms no part of this invention, and no claim is made herein to any of the details of that machine, as it constitutes the subject-matter of a pending application filed by myself and another as joint inventors. It is merely shown here as one form of machine to which my invention may be applied. Obviously the invention is applicable to any of the well-known forms of disk-harrows.

In the accompanying drawings, A represents the draft-pole, and B B opposing gangs of cutting-disks. Each disk-gang is shown as hinged to the rear end of the pole and connected at its outer end with an adjusting-yoke, C, which engages with hooks *c* on the pole. The driver, by disengaging this yoke from the hooks on the pole, can adjust the gang to any desired angle relatively to the draft-line by backing or starting the team. On the rear end of the pole I mount a casting, D, which is formed with a socket in which a cranked arm, E, plays. The rear end of this cranked arm is bent, as shown, and has mounted thereon a cutting-disk. The inner end of the cranked arm is turned up, as shown, and has pivoted thereon a link, f, which is provided with a series of apertures for the reception of a pin, g, on the casting. By the adjustment of this link it will be obvious that the disk may be set at varying degrees of inclination relatively to the soil, or may be turned up entirely out of the way when the machine is being transported, the disk being held in any of the positions by the pin g engaging in one of the sockets in the link f.

In the particular construction shown it is desirable that the disk should be turned up out of the way for transportation, because when down it is held at an angle to the draft-line, whereas the disks in the gangs may be turned parallel with the draft-line.

It will be observed that the disk trails after the machine instead of being mounted on a vertical support. I prefer such a construction.

Obviously the details of construction may be varied in a large number of ways, and I do not limit myself to the specific construction shown.

As recited at the beginning of this specification, I am aware of the patent of Nishwitz, No. 97,680. I am also aware of the patent of J. S. Corbin, No. 308,305; and I do not, therefore, claim any such subject-matter; but, so far as such patents are concerned, limit myself specifically to the subject-matter below.

I claim as my invention—

1. The combination of a pole or frame, vibratory adjustable disk-gangs, a cutting-disk arranged in rear of the pole and adapted to cut the strip of earth between the inner disks of said gangs, and mechanism for adjusting the angle of said disk relatively to the draft-line.

2. The combination of a pole or frame, angularly-adjustable vibratory disk-gangs, a central cutting-disk on the pole or frame, and mechanism whereby said disk may be angled relatively to the draft-line.

3. The combination of a pole or frame, adjustable disk-gangs, a cutting-disk arranged in rear of the inner disks of said gangs, and mechanism for angling said disk relatively to the line of draft.

4. The combination of a pole or frame, vibratory adjustable disk-gangs, mechanism for angling the gangs to the line of draft, a central cutting-disk, and mechanism for angling said disk to the line of draft independently of the adjustment or angling of the disk-gangs.

5. The combination of a pole or frame, vibratory adjustable disk-gangs, an independent cutting-disk adapted to cut open the space between the inner ends of said gangs, and also adapted to be turned up out of the way when the machine is being transported, and means for angling said disk relatively to the draft-line.

6. The combination of a pole or frame, vibratory angularly-adjustable disk-gangs, a central cutting-disk, for the purpose described, adapted to work at an angle to the draft-line, and means for raising and lowering said central disk.

7. The combination of a pole or frame, vibratory adjustable disk-gangs, a cutting-disk adapted to cut the strip left between the inner disks of said gangs, and mechanism for adjusting said cutting-disk vertically and angularly to vary its inclination and relation to the soil.

8. The combination, substantially as set forth, of a frame or pole, opposing disk-gangs, a casting or socket on the pole or frame, the crank-shaft rocking therein, and a cutting-disk on one end of the shaft and disk-adjusting device on the other.

In testimony whereof I have hereunto subscribed my name.

ANDREW G. HILL.

Witnesses:
J. B. FOLEY,
JAMES JAFFREY.